Patented June 27, 1939

2,164,154

UNITED STATES PATENT OFFICE 2,164,154

HYDROGENATION OF MONO NITRATED ALKOXY BENZENES

Clyde O. Henke, Wilmington, Del., and Roland G. Benner, Carneys Point, N. J., assignors to E. I. du Pont de Nemours & Company, Wilmington, Del., a corporation of Delaware No Drawing. Application October 19, 1935, Serial No. 45,828

17 Claims. (Cl. 260—575)

This invention relates to a process for the manufacture of mono amino alkoxy benzenes and more particularly to a process for their manufacture by liquid phase hydrogenation of mono nitrated alkoxy benzenes. Still more particularly this invention relates to the manufacture of orthoanisidine, and paraphenetidine.

Alkoxyamino benzenes have heretofore been produced mostly by the reduction of nitrated alkoxy benzenes with iron or zinc dust with small amounts of acid. Few references to catalytic reduction with hydrogen are given in the literature. Brown and Henke (J. Phy. Chem. 27, 739) obtained a 93% yield of orthoanisidine by passing o-nitroanisole vapor and hydrogen over a tin catalyst. Adams, Cohen, and Rees (J. A. C. S. 1927, 49, 1093) reduced orthonitroanisole in ethyl alcohol solution to orthoanisidine with hydrogen in the presence of a platinum catalyst. Ellis (Hydrogenation of Organic Substances, 3rd ed., page 430) states that the reduction of nitroanisole to anisidine with hydrogen by the use of the catalysts of Bolten and Lush has been tried, but is non-committal as to the success and detail as to whether vapor phase or liquid phase was attempted.

The reduction of nitrated alkoxy benzenes with hydrogen in the liquid phase and in the presence of a nickel catalyst to alkoxy amino benzenes has not been disclosed. Brochet (Bull. (4) 15, 554, 1914) states that nitro compounds can be reduced with hydrogen in the presence of a nickel catalyst and in the liquid phase. He gives no experimental results, but makes a few broad statements regarding the catalytic reduction of nitro compounds in general.

This invention has as an object an improved process for the production of mono amino alkoxy compounds of the benzene series. A further object is to produce these amines by liquid phase hydrogenation of the corresponding nitrated alkoxy compounds of the benzene series in the presence of a nickel catalyst with a maximum yield and under practical operating conditions. A still further object is the production of orthoanisidine and paraphenetidine from the corresponding nitro bodies.

These objects are accomplished by the following invention which comprises catalytically hydrogenating mono nitrated alkoxy compounds of the benzene series in the liquid phase and in the presence of a nickel catalyst at temperatures of 50 to 175° C. and at pressures above 150 lbs. per sq. in.

Mono nitrated alkoxy compounds of the benzene series, such as para nitro phenetole and ortho nitro anisole, are reduced in the liquid phase to amines (p-phenetidine or o-anisidine). The hydrogenation is preferably carried out at 60 to 100° C. and at hydrogen pressures above 300 lbs. per sq. in. in the presence of a nickel catalyst and in the presence of a small amount of initial water and alkali. The alkaline substance such as sodium acetate is added in suitable quantities to promote a more rapid reduction, but is not essential. Free bases such as barium hydroxide and salts of weak acids and strong bases which react alkaline such as sodium acetate, sodium bicarbonate, and trisodium phosphate have been advantageously added. Other alkaline reagents of this type can also be used. A small amount of water (5% or less of the weight of the nitro compound) is not essential, but is added to promote a rapid initial reaction. When water is added the reduction starts immediately. If dry ortho nitro anisole or p-nitro phenetole are used, the reduction is exceedingly slow for 1 to 2 hours or until a small amount of water is formed after which the reduction sets in and thereafter continues at practically a normal rate.

The preferred method of reduction is as above described, i. e., without the use of solvents. However, alkoxy amino benzenes can be economically produced by hydrogenation of the nitrated alkoxy benzenes in a solvent such as methanol in the presence of a nickel catalyst at temperatures of 50 to 175° C. and at pressures above 150 pounds. When solvents are used, water is not added and is not advantageous, nor is the addition of an alkaline substance beneficial.

The following examples illustrate the invention:

Example I

To 100 parts of orthonitroanisole and 1.5 parts nickel catalyst (containing 25% reduced nickel) in an autoclave equipped for rapid agitation are added .12 part sodium acetate dissolved in 5 parts water. The autoclave is closed, and the orthonitroanisole is reduced at 70 to 90° C. at 400 to 500 pounds hydrogen pressure. When hydrogen absorption has ceased, the pressure is released, and the charge is filtered. The filtrate contains orthoanisidine and water which are separated by decantation. The amine thus produced is vacuum distilled through a short column and a colorless distillate which analyzes 99 to 100% anisidine is obtained in 96 to 98% of the theoretical yield.

Example II

To 100 parts of paranitro-phenetole and 2.0 parts nickel catalyst (containing 25% reduced nickel) is added .12 part sodium acetate in 5 parts water, and the mass is hydrogenated as in Example I. After filtration the amine may be separated from the water by decantation and then vacuum distilled, or the whole filtrate may be distilled. The distilled amine is a colorless liquid which analyzes 99 to 100% as paraphenetidine and is obtained in 95 to 98% of the theoretical yield.

Example III

To 100 parts of o-nitroanisole (or 100 parts of p-nitrophenetole) and 50 parts methanol in an autoclave equipped for rapid agitation are added 0.75 part nickel catalyst (containing 25% reduced nickel). The mass is hydrogenated at 110 to 130° C. at 400 to 500 pounds pressure. When hydrogen absorption has ceased, the pressure is released, and the charge is filtered. The filtrate contains orthoanisidine (or paraphenetidine), methanol, and water. Methanol can be recovered by fractionation, and the amine may be purified by distillation. A colorless distillate which analyzes 99 to 100% anisidine (or phenetidine) is obtained in 94 to 96% of the theoretical yield.

This invention is not limited to the proportions of the various materials given in the preceding examples nor to the specific temperatures or pressures used in those examples. In Examples 1 and 2 temperatures of 50 to 130° C. and pressures of 300 to 2000 lbs. and higher may be used. The speed of the reaction in general is increased by increasing either the temperature or the pressure, but much better yields are obtained with low temperatures (as 60 to 100° C.) and high pressures (above 400 pounds). Higher temperatures and lower pressures promote the formation of non-distillable residues which results in low yields of the desired amine. Higher pressures are advantageous, but the advantages become small above 500 pounds. Larger amounts of water as 1.5 times the weight of nitro compound may be used. Still larger amounts, however, (such as three times the weight of the nitro body) reduce the output of an autoclave too much unless an excessive amount of catalyst is used, since the rate of hydrogen absorption for an autoclave charge decreases when the nitro compound is diluted with water.

Smaller amounts of water may be used if desired. Small traces of water are sufficient and appear to be necessary for a rapid initial hydrogenation. As the reaction proceeds water is formed and the rate of hydrogen absorption increases. The amount of water which is present in the usual technical grade of water washed paranitrophenetole is sufficient to start the reduction.

When solvents are used as in Example 3 temperatures of 50 to 175° C. and pressures above 150 pounds may be used. High temperatures and low pressures do not promote the formation of non-distillable residues to as great a degree as when solvents are not used. Higher temperatures can, therefore, be advantageously employed, since the speed of the reaction is increased by increasing the temperature.

The amount of catalyst used can be varied considerably. In Examples I and II the amount of reduced nickel in the catalyst is 0.4% and 0.5%, respectively, of the weight of the nitro bodies. In Example III the reduced nickel in the catalyst is about 0.20% of the weight of the nitro bodies. Less catalyst may be used, but the reduction will require a longer period of time. More catalyst may also be used. However, when the nickel in the catalyst becomes more than 4.0% of the nitro bodies, the amount becomes excessive and difficulties of removal, separation and handling appear. Active nickel containing catalysts, well known to the art, whether supported or not, may be used.

By the reduction of mono nitrated alkoxy benzenes as described in this application, amines of exceptional purity are economically obtained in 95 to 98% of the theoretical yields.

As many apparently widely different embodiments of this invention may be made without departing from the spirit and scope thereof, it is to be understood that we do not limit ourselves to the specific embodiments thereof except as defined in the appended patent claims.

We claim:

1. A process for the production of mono amino lower alkoxy benzene which comprises catalytically hydrogenating mono nitrated lower alkoxy benzene in the liquid phase, said hydrogenation being carried out in the presence of a nickel catalyst, at a temperature between 50° and 175° C. and at a pressure in excess of 150 lbs. per sq. in.

2. A process for the production of mono amino lower alkoxy benzene which comprises catalytically hydrogenating mono nitrated lower alkoxy benzene in the liquid phase, said hydrogenation being carried out in the presence of a nickel catalyst at a temperature from 50 to 130° C. at a pressure in excess of 300 pounds per sq. in., said reaction being further characterized in that it is carried out in the absence of a solvent.

3. A process for the production of a mono amino lower alkoxy benzene, which comprises reacting in the liquid phase a mono nitrated lower alkoxy benzene with hydrogen at a temperature within the range from 50° to 130° C. and at a pressure in excess of 300 lbs. per sq. in., in the presence of a nickel catalyst and in the presence of water in an amount less than 1.5 times the weight of the nitro body, said reaction being further characterized in that it is carried out in the absence of a solvent 4. The process in accordance with claim 3 characterized in that the temperature is within the range from 60° to 100° C.

5. The process in accordance with claim 3 characterized in that the pressure is within the range from 400 to 500 lbs. per sq. in.

6. A process for the production of a mono amino lower alkoxy benzene, which comprises reacting in the liquid phase a mono nitrated lower alkoxy benzene with hydrogen at a temperature within the range from 50° to 130° C. and at a pressure in excess of 300 lbs. per sq. in., in the presence of a nickel catalyst, water in an amount less than 1.5 times the weight of the nitro body, and sodium acetate in an amount of the order of 0.12% of the weight of the nitro body, said reaction being further characterized in that it is carried out in the absence of a solvent.

7. The process for the production of orthoanisidine, which comprises reacting in the liquid phase ortho nitro anisole with hydrogen at a temperature from about 60 to about 100° C. and at a pressure from about 400 to about 500 lbs. per sq. in., in the presence of a nickel catalyst and water in an amount less than 1.5 times the weight of the nitro body, said reaction being further characterized in that it is carried out in the absence of a solvent.

8. The process in accordance with claim 7 characterized in that the nickel catalyst is present in an amount equivalent to about 1.5% by weight of the ortho nitro anisole.

9. The process for the production of ortho-anisidine, which comprises reacting in the liquid phase ortho nitro anisole with hydrogen at a temperature from about 60 to about 100° C. and at a pressure from about 400 to about 500 lbs. per sq. in., in the presence of a nickel catalyst, water in an amount less than 1.5 times the weight of the nitro body, and sodium acetate in an amount of the order of 0.12% of the weight of the nitro body, said reaction being further characterized in that it is carried out in the absence of a solvent.

10. The process for the production of ortho-anisidine, which comprises reacting ortho nitro anisole in the liquid phase with hydrogen at a temperature from about 60 to about 100° C. and at a pressure from about 400 to about 500 lbs. per sq. in., in the presence of a nickel catalyst in the amount of about 1.5% by weight of the nitro compound and in the presence of water in the amount of about 5% of the nitro compound and also in the presence of sodium acetate in the amount of about 0.12% of the nitro compound, said reaction being further characterized in that it is carried out in the absence of a solvent.

11. The process for the production of para-phenetidine, which comprises reacting in the liquid phase para nitro phenetol with hydrogen at a temperature from about 60 to about 100° C. and at a pressure from about 400 to about 500 lbs. per sq. in., in the presence of a nickel catalyst and water in an amount less than 1.5 times the weight of the nitro body, said reaction being further characterized in that it is carried out in the absence of a solvent.

12. The process for the production of para-phenetidine, which comprises reacting in the liquid phase para nitro phenetol with hydrogen at a temperature from about 60 to about 100° C. and at a pressure from about 400 to 500 lbs. per sq. in., in the presence of a nickel catalyst, water in an amount less than 1.5 times the weight of the nitro body, and sodium acetate in an amount of the order of 0.12% of the weight of the nitro body, said reaction being further characterized in that it is carried out in the absence of a solvent.

13. The process in accordance with claim 12 characterized in that the nickel catalyst is present in an amount of about 2% by weight of the nitro compound.

14. A process for the production of mono amino lower alkoxy benzene which comprises catalytically hydrogenating mono nitrated lower alkoxy benzene in the liquid phase, said hydrogenation being carried out in the presence of a nickel catalyst and in the presence of a solvent at a temperature from 50° to 175° C. and at a pressure in excess of 150 pounds per square inch.

15. The process in accordance with claim 14 characterized in that the hydrogenation is carried out at a pressure from about 400 to about 500 pounds per square inch.

16. The process in accordance with claim 14 characterized in that the hydrogenation is carried out at a temperature from about 110° to about 130° C.

17. The process for the production of para-phenetidine, which comprises reacting para nitro phenetol in the liquid phase with hydrogen at a temperature from about 110° to about 130° C. and at a pressure from about 400 to about 500 pounds per square inch, said hydrogenation being carried out in the presence of a nickel catalyst in the amount of about 0.75% by weight of the nitro compound and in the presence of methanol in the amount of about 50% by weight of the nitro compound.

CLYDE O. HENKE.
ROLAND GEORGE BENNER.